(12) United States Patent
House et al.

(10) Patent No.: US 11,193,505 B2
(45) Date of Patent: Dec. 7, 2021

(54) ACCUMULATOR PISTON FOR USE IN VEHICLE TRANSMISSION SYSTEM

(71) Applicant: Seal Aftermarket Products, LLC, Pembroke Park, FL (US)

(72) Inventors: Kyle R. House, Houston, TX (US); Andrew Mackey, Boca Raton, FL (US)

(73) Assignee: SAPTFC HOLDING, LLC, Pembroke Park, FL (US)

( * ) Notice: Subject to any disclaimer, the term of this patent is extended or adjusted under 35 U.S.C. 154(b) by 0 days.

(21) Appl. No.: 16/842,181

(22) Filed: Apr. 7, 2020

(65) Prior Publication Data
US 2021/0062830 A1    Mar. 4, 2021

Related U.S. Application Data

(63) Continuation of application No. 16/556,487, filed on Aug. 30, 2019, now Pat. No. 10,634,170.

(51) Int. Cl.
*F15B 1/04*    (2006.01)

(52) U.S. Cl.
CPC ............ *F15B 1/04* (2013.01); *F15B 2201/31* (2013.01); *F15B 2201/312* (2013.01)

(58) Field of Classification Search
CPC .. F16L 55/053; F15B 1/04; F15B 1/24; F15B 2201/31; F15B 2201/312
USPC .......................................................... 138/31
See application file for complete search history.

(56) References Cited

U.S. PATENT DOCUMENTS

| | | | |
|---|---|---|---|
| 2,715,419 A * | 8/1955 | Ford ..................... | F16L 55/052 138/31 |
| 2,729,244 A * | 1/1956 | Alaska .................. | F16L 55/052 138/31 |
| 3,863,677 A * | 2/1975 | Tarsha ..................... | F16J 10/04 138/31 |
| 3,923,208 A * | 12/1975 | Bergloff .................... | F15B 1/24 222/386 |
| 4,043,352 A | 8/1977 | Simpson | |
| 4,644,976 A * | 2/1987 | Peter ......................... | F15B 1/24 138/31 |
| 4,685,491 A * | 8/1987 | Fulmer ..................... | F15B 1/24 138/30 |
| 6,899,211 B2 | 5/2005 | Carne | |
| 7,516,760 B2 * | 4/2009 | Weber ....................... | F15B 1/24 138/30 |

(Continued)

OTHER PUBLICATIONS

Sonnax® Company Brochure for Pinless Accumulator Piston Kit, Part No. 77998-03K, 2017, Sonnax Industries, Inc.

(Continued)

*Primary Examiner* — Patrick F Brinson
(74) *Attorney, Agent, or Firm* — Burr & Forman LLP; Jeffrey H. Kamenetsky

(57) ABSTRACT

An accumulator piston configured to be situated within an accumulator bore of a housing for use in vehicle transmissions. The accumulator piston including a casing, the casing including a top surface, a bottom surface opposite the top surface, and a side wall situated between the top surface and the bottom surface, a pin guide protruding from the top surface of the casing, the pin guide including a centrally disposed aperture, the aperture configured to receive an elongated pin, and a sealing member encircling the side wall of the casing such that the sealing member covers any exposed surface of the side wall.

9 Claims, 8 Drawing Sheets

(56) References Cited

U.S. PATENT DOCUMENTS

| | | | |
|---|---|---|---|
| 9,885,373 B1* | 2/2018 | Abel | ............... F16L 55/055 |
| 2005/0034953 A1* | 2/2005 | Carne | ............... F16D 48/02 |
| | | | 192/85.63 |

OTHER PUBLICATIONS

TransGo® Catalog, High Quality Aluminum Replacement Accumulator Piston, Fits 4L60E 95-02 "Type 2" 1-2 Accumulator Piston with .236 Pin size and leg, 2002-2019.

TransGo® Catalog, High Quality Aluminum Replacement Accumulator Piston, Fits 4L65E and 4L75E 03-09 "Type 3" 1-2 Accumulator Piston with .236 Pin size and no legs, 2002-2019.

* cited by examiner

ACCUMULATOR PISTON FOR USE IN VEHICLE TRANSMISSION SYSTEM

CROSS-REFERENCE TO RELATED APPLICATION

This application is a continuation of U.S. patent application Ser. No. 16/556,487, filed on Aug. 30, 2019, the contents of which are hereby incorporated by reference.

TECHNICAL FIELD

This disclosure relates to accumulator pistons for use in vehicles and more specifically to an accumulator piston having a bi-directional lip seal around the outer perimeter of the accumulator piston to provide improved lateral support.

BACKGROUND

Vehicle transmissions, particularly automatic vehicle transmissions include both mechanical and hydraulic subsystems. The hydraulic subsystem actuates clutches in order to change the transmission gear speed ratio based on a controller signal.

Included in the hydraulic subsystem are accumulators. Accumulators are used to dampen the harshness of a shift in a transmission by slowing or accumulating the pressure rise in the application circuit of a clutch pack or band. In other words, the accumulator acts as a modifier that affects transmission shift timing and quality. Accumulators absorb the initial shock of pressure changes in the hydraulic circuit. When a clutch or band's piston or servo first strokes, there is low pressure in the circuit. As soon as the piston or servo starts to apply, pressure increases rapidly. Without a shift modifying device like an accumulator, sudden and harsh shifting is likely to occur.

Accumulators are designed to "cushion" or "dampen" a shift by slowing down the apply oil to a clutch pack or a band. Accumulators may overcome spring force, or hydraulic fluid during a shift event to provide this "cushion" or "dampening" effect.

In typical prior art accumulators, the accumulator is made of aluminum and is guided through its stroke by a steel pin through the center of the accumulator piston. The piston is sealed and supported on the outside diameter by a single lathe cut rubber type seal, or a single polytetrafluroethylene (PTFE) sealing ring. Often times, accumulators can leak due to such things as a worn seal, worn bore or worn centering pin. Further, a single seal provides inadequate lateral support that allows the piston to rock in the bore on apply and release. This continual rocking creates wear to the pin bore and/or seal, and, in extreme cases, damages the accumulator bore. This wear creates a leak in the accumulator hydraulic circuit and can contribute to slipping of the brake band, and or the slipping or burning of the clutch pack.

Thus, there is a need for an accumulator piston design that does not result in wear or damage to the accumulator bore or pin bore. The present disclosure addresses this need.

SUMMARY

In one embodiment, the accumulator piston of the present disclosure is configured to be situated within an accumulator bore of a housing. In one aspect, the accumulator piston includes a casing, the casing including a top surface, a bottom surface opposite the top surface, and a side wall situated between the top surface and the bottom surface. The accumulator piston also includes a pin guide protruding from the top surface of the casing, the pin guide including a centrally disposed bore, the bore configured to receive an elongated pin, and a sealing member encircling the side wall of the casing such that the sealing member covers any exposed surface of the side wall.

In another embodiment, the accumulator piston of the present disclosure is configured to be situated within an accumulator bore of a housing for use in automatic vehicle transmissions. In one aspect, the accumulator piston includes a cylindrical casing, the cylindrical casing including a top surface, a bottom surface opposite the top surface, and a side wall situated between the top surface and the bottom surface. The accumulator piston also includes a pin guide protruding from the top surface of the cylindrical casing, the pin guide including a centrally disposed bore, the bore configured to receive an elongated pin. The accumulator piston also includes a polymer sealing member encircling the side wall of the cylindrical casing such that the sealing member covers any exposed surface of the side wall, the sealing member providing a uniform surface such that the sealing member is configured to prevent misalignment of the accumulator piston within the accumulator bore by maintaining the cylindrical casing in a substantially parallel orientation with respect to the accumulator bore.

DETAILED DESCRIPTION OF EXEMPLARY EMBODIMENTS

Figure 1:
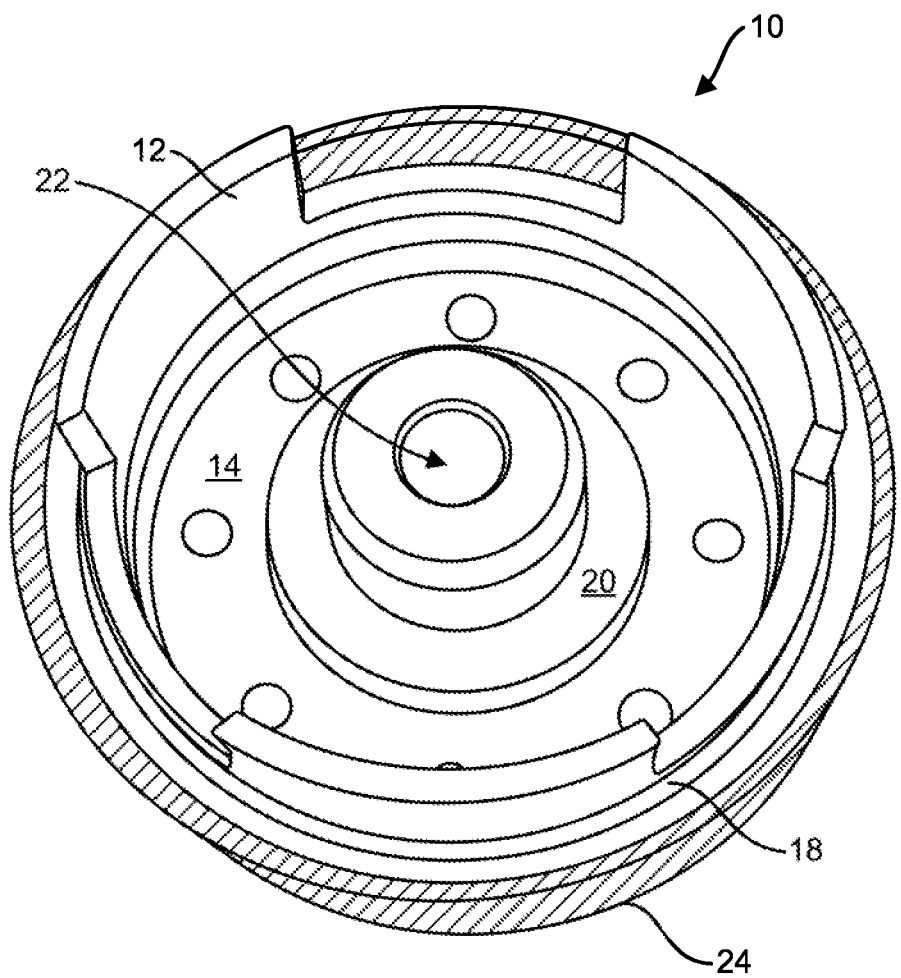
FIG. 1 is a top view of an accumulator piston in accordance with the principles of the present disclosure.

The present disclosure provides a novel accumulator piston for use in a housing of a vehicle's transmission system. The housing could be, for example, an accumulator housing, or a transmission case or housing. Thus, the term "housing" as used herein shall not be limited in any way and instead be broadly construed to include an accumulator housing, a transmission case, or any other type of housing that may be used to receive and house an accumulator piston. Referring now to the figures, FIG. 1 illustrates a top view of an accumulator piston 10 in accordance with the principles of the present disclosure. Accumulator piston 10 is comprised of a cylindrical casing 12, the casing 12 having a top surface 14, a bottom surface 16 (shown in FIG. 2), and a side wall 18. Accumulator piston 10 is sized such that it can be incorporated within a housing (shown in FIGS. 7 and 8) of a vehicle's transmission system, for example, an automatic transmission system. Accumulator piston 10 acts as a shock absorber for the hydraulic subsystem. The accumulator piston 10 is used to dampen the shift of the transmission by slowing or accumulating the line rise in the application circuit of a clutch pack or band.

Protruding from the substantial center of top surface 14 of casing 12 is a pin guide 20, which includes a centrally disposed aperture 22. Aperture 22 is configured to receive an elongated accumulator pin that guides the accumulator piston 10 within the housing. Pin guide 20 can be formed separately and joined to the top surface 14 of casing 12, or can be an integral part of and incorporated into the top surface 14 of casing 12. In one embodiment, at least one of the pin guide 20 and the elongated pin inserted therein, is made of hardened steel.

To avoid the aforementioned problems associated with a piston rocking within the piston bore of the housing, the accumulator piston 10 of the present disclosure includes a sealing member 24 disposed around the periphery, i.e., the side wall 18 of cylindrical casing 12. As shown in FIG. 1 (and FIG. 2), sealing member 24 is a dual-lip seal that substantially covers the entirety of the exposed surface of side wall 18 of casing 12. Thus, sealing member 24 is not merely a narrow band that covers a portion of the side wall 18 of casing 12 or resides within a groove of casing 12, but instead is a dual-lip design that covers the side wall 18 and also extends over and beneath the side wall 18, i.e., thus covering more than just side wall 18 of casing 12. This is shown in FIG. 3 and discussed below.

In one embodiment, sealing member 24 is made from a polymer material, and in non-limiting embodiments, can be made of, for example, polymers such as hydrogenated nitrile, polyacrylate, fluorocarbon, and/or ethylene acrylate. However, the material that forms sealing member 24 as described in the present disclosure is not limited in any way. Sealing member 24 represents a bi-directional lip seal that provides improved lateral support for accumulator piston 10 within the accumulator bore of the housing by reducing or eliminating the rocking motion of accumulator piston 10 within the accumulator bore while in use. Thus, the design of seal member 24 represents an improvement over Original Equipment (OE) seal designs that lack a dual-lip seal.

Because sealing member 24 provides a dual-lip design that covers the substantial entirety of side wall 18 of casing 12, a more dynamic sealing mechanism is provided because the side wall 18 of casing 12 is not exposed. This also results in reduction or elimination of any fluid leakage in the accumulator hydraulic circuit subsystem.

Figure 2:
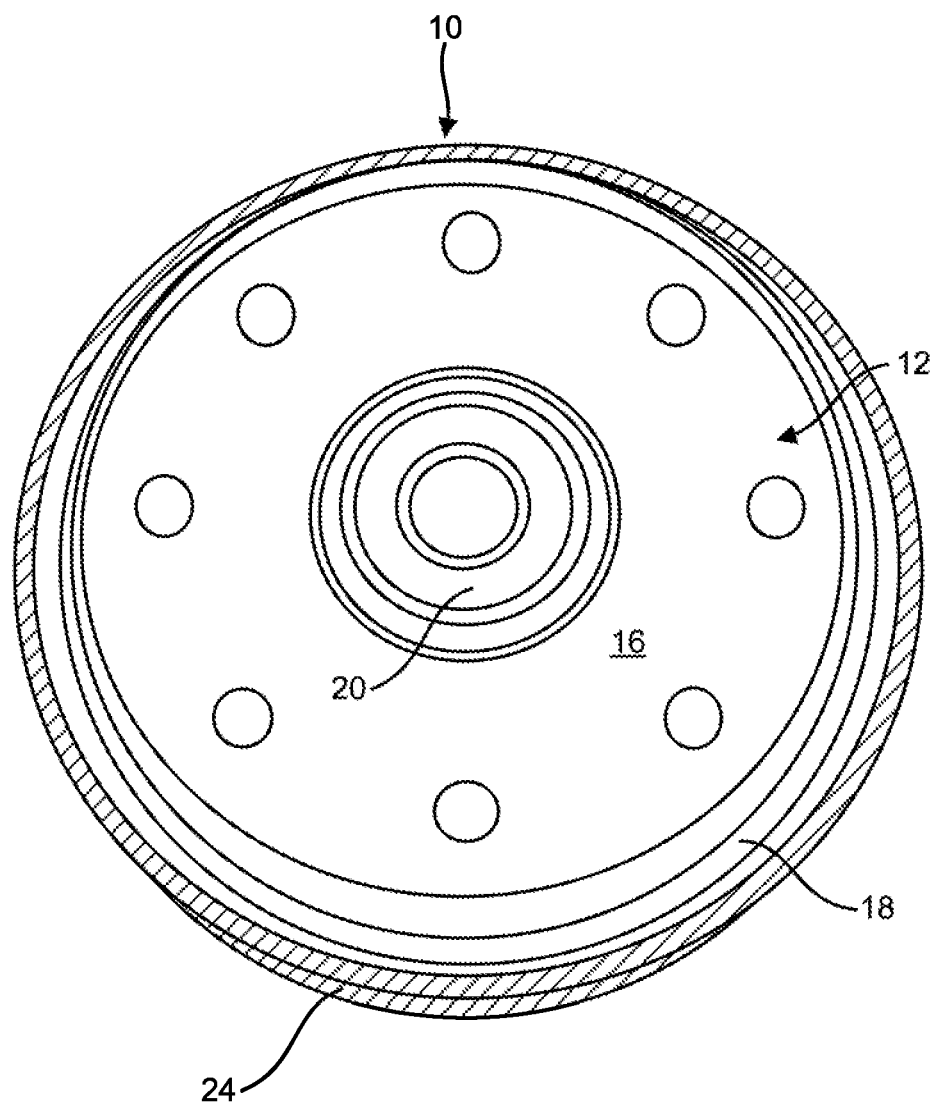
FIG. 2 is a bottom view of the accumulator piston in accordance with the principles of the present disclosure.
Figure 3:
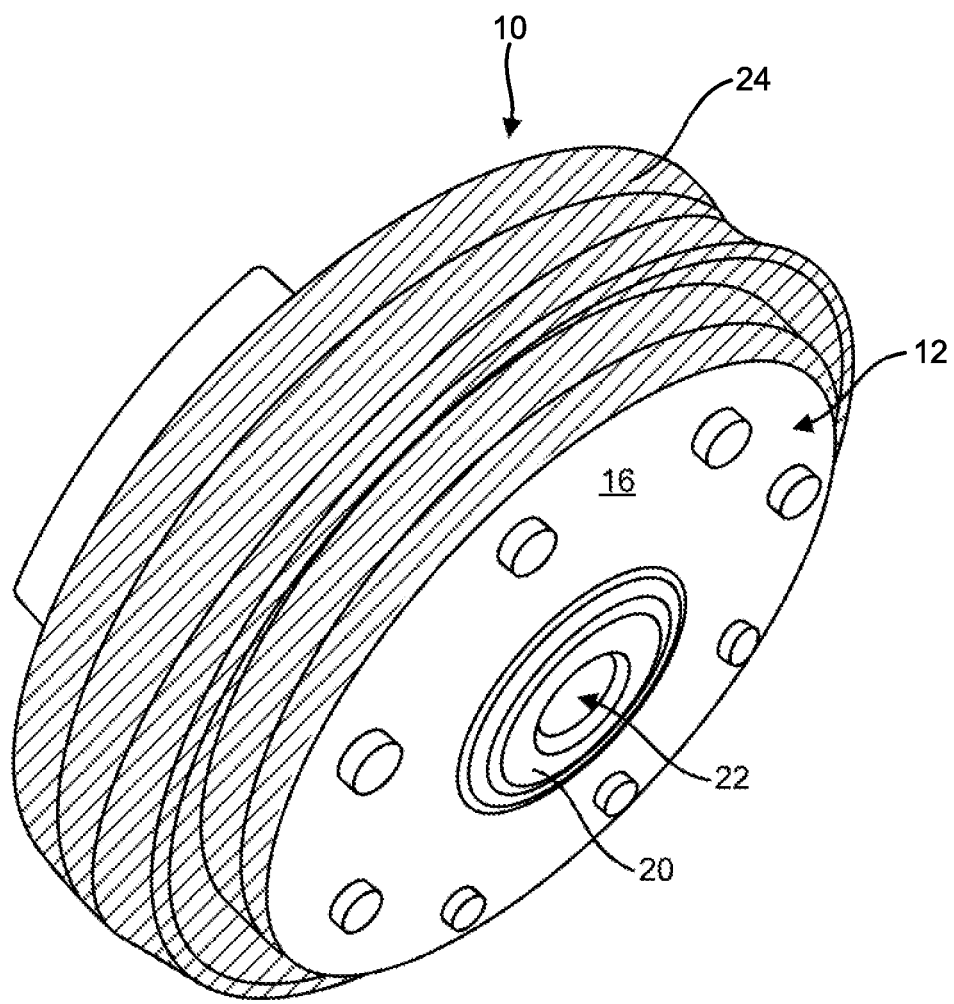
FIG. 3 is a side perspective view of the accumulator piston in accordance with the principles of the present disclosure.

FIG. 2 is a bottom view of accumulator piston 10 of the present disclosure. Sealing member 24 can again be seen encircling the outer periphery of casing 12, covering up side wall 18. As mentioned above, sealing member 24 provides increased stability to accumulator piston 10 as well as uniformity in allowing accumulator piston 10 to be able to be placed within a housing in either an "inverted" orientation, with bottom surface 16 exposed, or in an upright orientation, with top surface 14 exposed (as shown in FIG. 1). The bi-directional nature of accumulator piston 10 is discussed in greater detail below with regard to FIG. 7 and FIG. 8.

Figure 4:
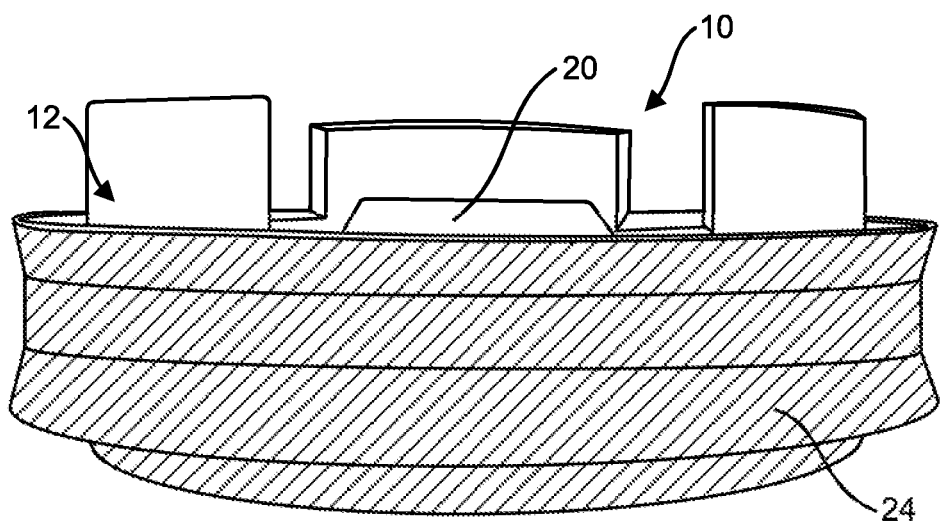
FIG. 4 is a side view of the accumulator piston in accordance with the principles of the present disclosure.

FIG. 3 and FIG. 4 illustrate accumulator piston 10 of the present disclosure in a side perspective view and side view, respectively. Sealing member 24 can be seen clearly covering any exposed surface of side wall 18 (not shown) of casing 12. Side wall 18 is covered by sealing member 24 to provide increased uniformity of accumulator piston 10, and prevent fluid leakage and increased stability when accumulator piston 10 is situated within the housing and in use.

Figure 5:
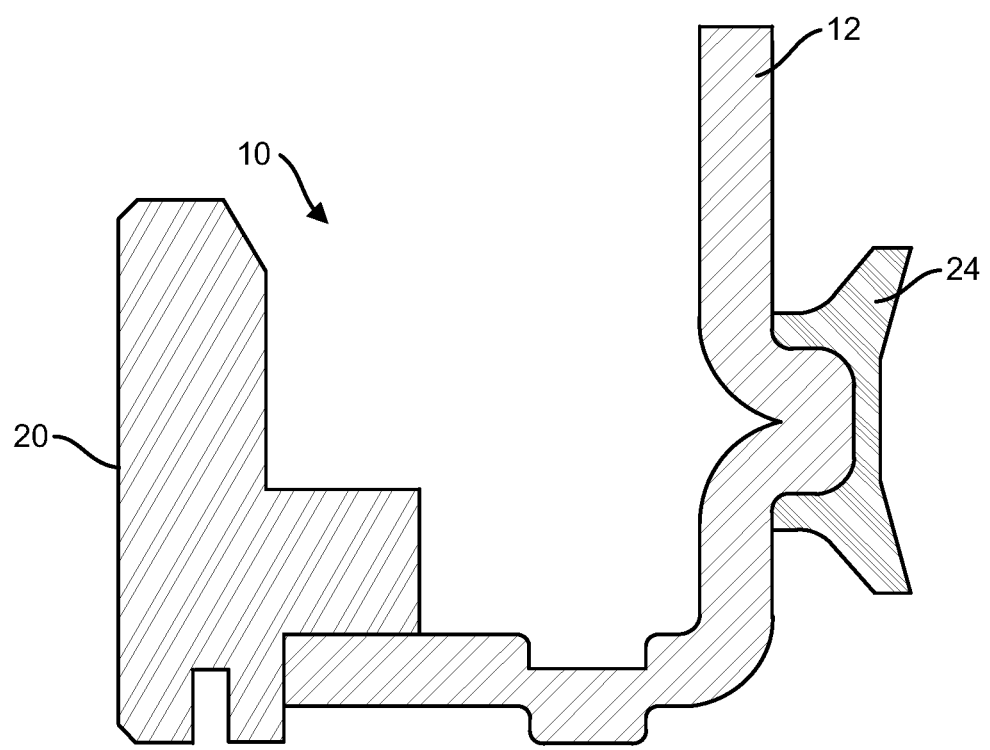
FIG. 5 is a cross-sectional view of the accumulator piston in accordance with the principles of the present disclosure.
Figure 6:
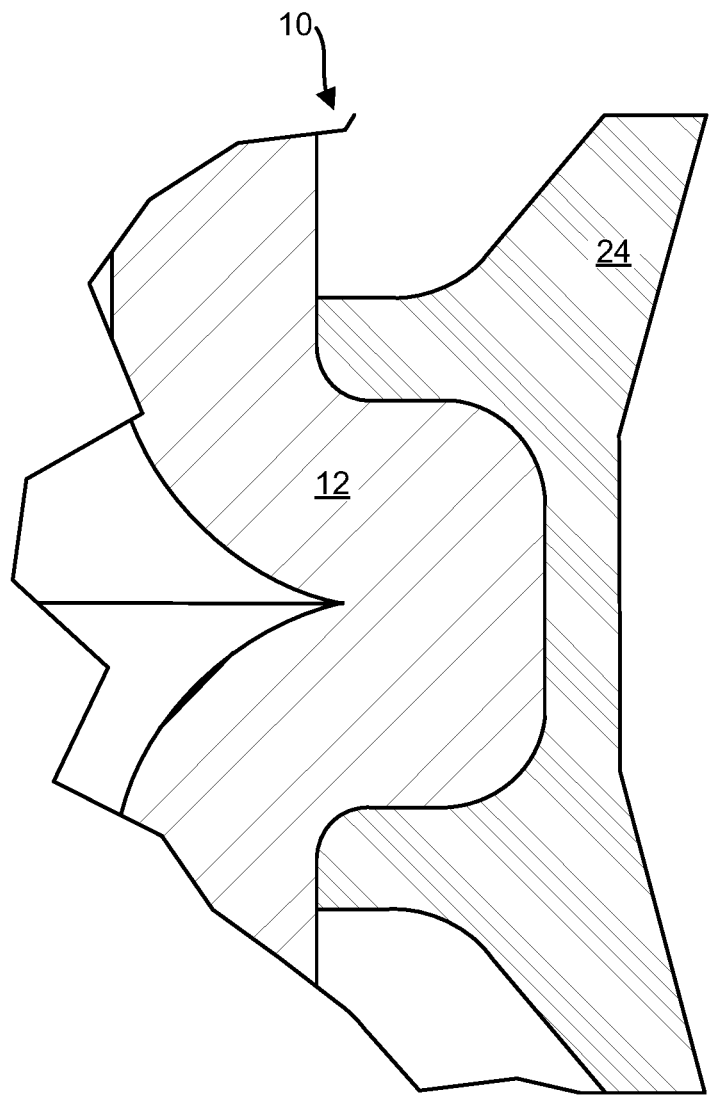
FIG. 6 is another cross-sectional view of the accumulator piston in accordance with the principles of the present disclosure, showing the casing and seal interface in greater detail.

FIGS. 5 and 6 are cross-sectional views of accumulator piston 10. In these figures, the relationship between sealing member 24 and casing 12 can be seen. Sealing member 24 provides a tight seal around the outer periphery of casing 12, which provides, stability, minimizes leakage, and, advantageously, allows the accumulator piston 10 to be inserted within the housing in either in an inverted or upright orientation.

Figure 7:
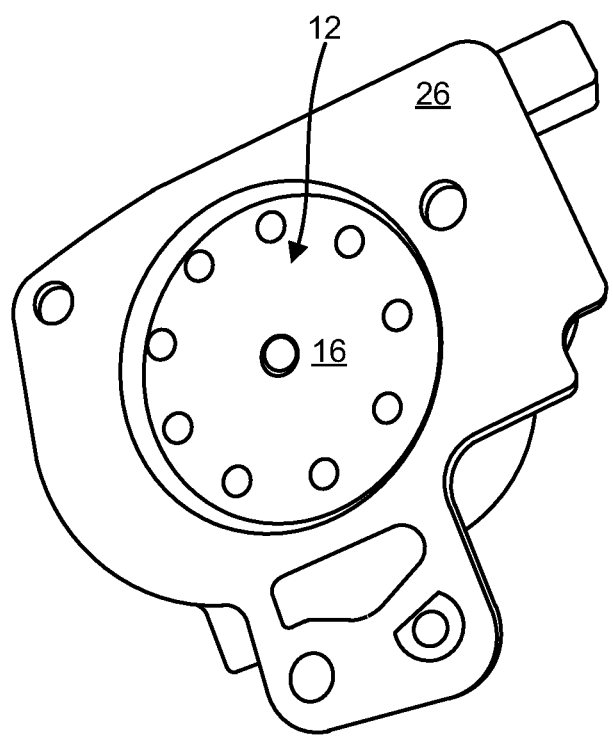
FIG. 7 is a top, perspective view showing the accumulator piston inserted within a housing in an inverted position.
Figure 8:
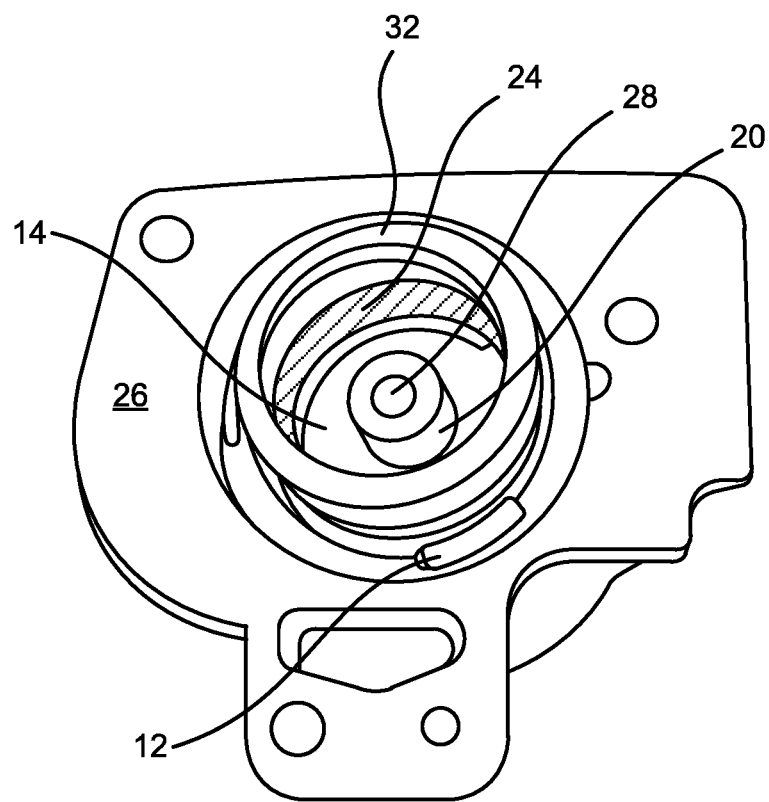
FIG. 8 is a top, perspective view showing the accumulator piston inserted within the housing in an un-inverted view.

FIG. 7 and FIG. 8 show how sealing member 24 allows accumulator piston 10 to be inserted within a housing 26 bi-directionally. This means accumulator piston 10 can be inserted within housing 26 in either an inverted fashion, with bottom surface 16 of casing 12 facing up (FIG. 7), or in a traditional non-inverted fashion, with the top surface 14 of casing 12 facing up.

As explained above, sealing member forms a uniform border around the periphery of casing 12 such that it makes no difference how accumulator piston 10 is inserted within the accumulator bore of housing 26. For example, in FIG. 7, accumulator piston 10 is inserted within the accumulator bore of housing 26 in an inverted position. In this embodiment, the spring pocket is facing into the housing (and therefore not show in in FIG. 7). In one embodiment, bottom surface 16 of casing 12 of accumulator piston 10 is substantially flush with the surface of housing 26. Due to the arrangement of sealing member 24 around the outer circumference of casing 12, i.e., covering side wall 18, a snug seal is formed between accumulator piston 10 and the interior of housing 26, thus minimizing or eliminating fluid leakage and any rocking that might occur of accumulator piston 10 while inserted within housing 26.

Referring to FIG. 8, an alternate embodiment is shown where accumulator piston 10 is inserted within the accumulator bore of housing 26 in a non-inverted orientation. In this embodiment, piston 10 is inserted within the interior of housing 26 with spring pocket 32 facing away from housing 26. Again, as in the inverted embodiment shown in FIG. 7, sealing member 24 provides a secure seal between accumulator piston 10 and housing 26. In both embodiments, due to the seal between casing 12 of accumulator piston 10, fluid leakage is prevented or at least minimized, and movement or rocking of accumulator piston 10 within housing 26 is virtually eliminated. Further, seal member 24 adapts to pressure fluctuations in that as pressure upon the accumulator piston 10 while it is within housing 26 increases, seal member 24 provides an even tighter and more secure seal. Thus, sealing member 24 imparts a pressure on casing 12 of accumulator piston 10 that is proportional to a pressure imparted on sealing member 24 from, for example, fluids within housing 26.

Another feature of seal member 24 is that it allows accumulator piston 10 to be inserted within the accumulator bore even if the accumulator bore is non-concentric. Due to the pliable nature of seal member 24 and its orientation around the outer circumference of casing 12, which creates a uniform exposed surface, accumulator piston 10 is able to be inserted and secured within an accumulator bore that is not perfectly circular or concentric with accumulator piston 10.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. An accumulator piston configured to be situated within an accumulator bore of a housing, the accumulator piston comprising:
    a casing comprising:
        a top surface, a bottom surface opposite the top surface, and a side wall situated between the top surface and the bottom surface;
    a pin guide protruding from the top surface of the casing, the pin guide including a centrally disposed aperture, the aperture configured to receive an elongated pin; and
    a continuous sealing member completely encircling the side wall of the casing such that the sealing member covers any exposed surface of the side wall, the continuous sealing member including a dual-lip design that allows the sealing member to extend over and beneath the side wall.

2. The accumulator piston of claim 1, wherein the sealing member is configured to prevent misalignment of the accumulator piston within the accumulator bore by maintaining the casing in a substantially parallel orientation with respect to the accumulator bore.

3. The accumulator piston of claim 1, wherein the pin guide is integral with the casing.

4. The accumulator piston of claim 1, wherein at least one of the pin guide and the elongated pin is made of hardened steel.

5. The accumulator piston of claim 1, wherein the sealing member allows the piston to adapt to accumulator bores that are non-concentric.

6. The accumulator piston of claim 1, wherein the sealing member is a polymer.

7. The accumulator piston of claim 6, wherein the polymer is at least one of hydrogenated nitrile, polyacrylate, fluorocarbon, and ethylene acrylate.

8. The accumulator piston of claim 1, wherein the sealing member imparts a pressure on the casing of the piston that is proportional to a pressure imparted on the sealing member.

9. An accumulator piston configured to be situated within an accumulator bore of a housing for use in automatic vehicle transmissions, the accumulator piston comprising:
    a cylindrical casing comprising:
        a top surface, a bottom surface opposite the top surface, and a side wall situated between the top surface and the bottom surface;
    a pin guide protruding from the top surface of the cylindrical casing, the pin guide including a centrally disposed aperture, the bore configured to receive an elongated pin; and
    a continuous polymer sealing member having a dual-lip design that allows the sealing member to completely encircle and extend over and beneath the side wall of the cylindrical casing such that the sealing member covers any exposed surface of the side wall, the sealing member providing a uniform surface such that the sealing member is configured to prevent misalignment of the accumulator piston within the accumulator bore by maintaining the cylindrical casing in a substantially parallel orientation with respect to the accumulator bore.

* * * * *